US005476590A

United States Patent [19]
Brose et al.

[11] Patent Number: 5,476,590
[45] Date of Patent: Dec. 19, 1995

[54] HYDROPHILIC POLYVINYLIDENE FLUORIDE MEMBRANES

[75] Inventors: Daniel J. Brose; Dwayne T. Friesen, both of Bend; James R. Lowell, Jr., Redman; Scott B. McCray, Bend, all of Oreg.; John M. Radovich, Fort Lauderdale, Fla.

[73] Assignee: Sartorius AG, Germany

[21] Appl. No.: 404,298

[22] Filed: Mar. 14, 1995

[51] Int. Cl.⁶ ................................................ B01D 65/08
[52] U.S. Cl. ................................. 210/636; 210/500.42
[58] Field of Search .................... 210/636, 500.42; 521/53, 918

[56] References Cited

U.S. PATENT DOCUMENTS 4,810,384  3/1989  Fabre ................................. 20/500.42

Primary Examiner—Frank Spear
Attorney, Agent, or Firm—Chernoff, Vilhauer, McClung & Stenzel

[57] ABSTRACT

Improved methods of rendering PVDF membranes hydrophilic are disclosed.

10 Claims, No Drawings

HYDROPHILIC POLYVINYLIDENE FLUORIDE MEMBRANES

BACKGROUND OF THE INVENTION

Methods of making polyvinylidene fluoride (PVDF) membranes and their use as filter media are known. See, for example, U.S. Pat. Nos. 4,203,847, 4,203,848 and 4,384,047. Various methods of rendering PVDF membranes hydrophilic are also known. For example, U.S. Pat. No. 4,943,373 discloses the use of a strongly alkaline solution of potassium permanganate for 3 to 10 minutes at temperatures up to 100° C.

SUMMARY OF THE INVENTION

There are essentially three aspects of the present invention, each aspect comprising an improved method of rendering PVDF membranes hydrophilic.

These three improved methods result in the formation of a hydrophilic PVDF membrane that is ideally suited to biological microfiltration applications because of its nonabsorptiveness with respect to proteins, colloids, microorganisms, oils and the like.

DETAILED DESCRIPTION OF PREFERRED EMBODIMENTS

According to the present invention, there are provided three improved methods of rendering hydrophilic a membrane that has been fabricated from a polymer that is predominantly PVDF.

In general, the preferred PVDF membrane starting material comprises isotropic membranes having a range of mean pore sizes of 0.1 to 5 microns, and the surface layer has a porosity of $\geq 10\%$, typically on the order of 30 to 60%. The ethanol bubble point (EtOH b.p.) range is typically 1 to 100 psi. The form of the membrane may be flat sheet or hollow fiber.

The starting material membranes are preferably fabricated from $\geq 90$ wt % PVDF or a copolymer of vinyl-idenefluoride and hexafluoropropylene, and the polymer is preferably present in the casting dope solution in an amount from 5 to 30 wt %, most preferably 12 to 22 wt %. Good sources of PVDF are Atochem North America, Inc. of Philadelphia, Pa. ("Kynar") and Soltex Corporation of Houston, Tex. ("Solef"). A good commercial source for the copolymer is Atochem ("Kynar 2800"). The hydrophilic rendering processes may be conducted in either a batch or a continuous mode.

In particular, the three methods are characterized by particular chemical oxidation or reduction steps. The general steps comprise wetting the membrane with water; performing either an oxidation step or a reduction step; rinsing the membrane with water; contacting the membrane with a bleach solution at an elevated temperature for a short time; performing a second water rinse; and drying the membrane.

Preferably, the reduction steps in this procedure comprise (1) contacting the membrane with a caustic solution of sodium dithionite and heating the same, most preferably at about 80° C. for about an hour; or (2) contacting the membrane with a caustic solution for a short time, most preferably at about 80° C. for about one minute, followed by a water rinse and contacting the membrane with an alkaline solution of glucosamine hydrochloride, most preferably at pH 12 and at about 80° C. for about an hour.

The preferred oxidation step is conducted in the same manner as reduction step (2) except that following the water rinse, the membrane is contacted with a weakly acidic solution of hydrogen peroxide, most preferably at about 40° C. for about an hour.

EXAMPLE 1

Eight hundred g of PVDF, 80 g of water (as a poreformer) and 3120 g triethylphosphate (TEP) were mixed in a stainless steel pot at 98.5° C. for 3 hours. The cloudpoint, or that temperature at which the solution becomes visibly turbid (corresponding to about 20 NTU), had been determined to be 45° C. The solution was cooled for 37 minutes to 20.6° C., whereupon it became slightly cloudy and moderately lumpy and grainy. The solution was then reheated to 82.2° C., during the course of which it became clear. The solution was then cast on glass plates in films that were 10 mils thick, then immersed for 6 minutes in a gelation bath of 73 vol% TEP in water. The membranes produced were rinsed with water and air dried. They revealed a non-skinned substantially isotropic structure, and had an EtOH b.p. of 21–22 psi.

EXAMPLES 2–4

A hydrophobic membrane prepared in substantially the same manner as in Example 1 was rendered hydrophilic by three different methods (dithionite, glucosamine, or hydrogen peroxide). The methods used comprised the following steps: (a) the membrane was thoroughly wetted with water; (b) an oxidation or reduction step was performed; (c) the membrane was thoroughly rinsed with water; (d) the membrane was placed in a 5.25% bleach solution at 50° C. for 20 seconds; (e) a second water rinse was performed; and (f) the membrane was dried.

The dithionite reduction step comprised placing the membrane in a solution of 10% NaOH and 10% $Na_2S_2O_4$ about 80° C. for about 60 minutes.

The glucosamine reduction step comprised placing the membrane in 30% KOH at 80° C. for one minute, immediately followed by rinsing with water, and then placing the membrane in a solution of 20% glucosamine hydrochloride at pH 12 and 80° C. for 60 minutes.

The hydrogen peroxide oxidation step comprised the same as the glucosamine oxidation step except that, following the water rinse, the membrane was placed in a weakly acidic solution of 6% $H_2O_2$ and 70% $CHCH_3COOH$ at 40° C. for 60 minutes.

Each of the three membranes so rendered hydrophilic were tested for wetting and adsorption of Bovine Serum Albumin (BSA). The results are reported in the Table below, with Wicking Time representing the amount of time for the membrane to absorb 10 ml of water, Even Wetting Time representing the amount of time for the membrane to appear uniformly wetted when placed on a water surface, and Adsorption being reported in units of micrograms/cm$^2$.

| Ex. No. | Treatment | Wicking Time (sec) | Even Wetting Time (sec) | Adsorption BSA* | BSA** |
|---|---|---|---|---|---|
| 2 | dithionite | 21 ± 5 | ≦1 | 34 ± 7 | 66 ± 7 |
| 3 | glucosamine | 8 ± 2 | ≦1 | 70 ± 5 | 87 ± 17 |
| 4 | hydrogen | 360 ± 60 | 40 | — | 73 ± 16 |

| Ex. No. | Treatment | Wicking Time (sec) | Even Wetting Time (sec) | Adsorption BSA* | BSA** |
|---|---|---|---|---|---|
| | peroxide | | | | |

*mM phosphate buffer; 1000 ppm BSA; ph 7.4
**mM phosphate buffer; 10,000 ppm BSA; pH 7.0

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method of rendering hydrophilic a non-skinned, substantially isotropic membrane fabricated from a polymer that is at least 90 wt % of a polymer selected from the group consisting of polyvinylidene fluoride and a copolymer of vinylidenefluoride and hexafluoropropylene, comprising the following steps:
   (a) wetting said membrane with water;
   (b) conducting a dithionate reduction of said membrane by contacting the same with a solution of NaOH and $Na_2S_2O_4$ and heating the same;
   (c) rinsing said membrane with water;
   (d) contacting said membrane with a bleach solution and heating the same;
   (e) rinsing said membrane with water; and
   (f) drying said membrane.

2. The method of claim 1 wherein step (b) is conducted at about 80° C. for about an hour.

3. The method of claim 1 wherein step (d) is conducted at about 50° C. for about 20 seconds.

4. A method of rendering hydrophilic a non-skinned, substantially isotropic membrane fabricated from a polymer that is at least 90 wt % of a polymer selected from the group consisting of polyvinylidene fluoride and a copolymer of vinylidenefluoride and hexafluoropropylene, comprising the following steps:
   (a) wetting said membrane with water;
   (b) conducting a glucosamine reduction of said membrane comprising the steps of
      (i) contacting said membrane with a caustic solution and heating,
      (ii) rinsing said membrane with water, and
      (iii) contacting said membrane with an alkaline solution of glucosamine and heating;
   (c) rinsing said membrane with water;
   (d) contacting said membrane with a bleach solution and heating the same;
   (e) rinsing said membrane with water; and
   (f) drying said membrane.

5. The method of claim 4 wherein step (i) of step (b) is conducted at about 80° C. for about one minute.

6. The method of claim 5 wherein step (iii) of step (b) is conducted at about 80° C. for about an hour.

7. A method of rendering hydrophilic a non-skinned, substantially isotropic microfiltration membrane fabricated from a polymer that is at least 90 wt % of a polymer selected from the group consisting of polyvinylidene fluoride and a copolymer of vinylidenefluoride and hexafluoropropylene, comprising the following steps:
   (a) wetting said membrane with water;
   (b) conducting an oxidation step comprising the steps of
      (i) contacting said membrane with a caustic solution and heating,
      (ii) rinsing said membrane with water, and
      (iii) contacting said membrane with a weakly acidic solution of hydrogen peroxide and heating;
   (c) rinsing said membrane with water;
   (d) contacting said membrane with a bleach solution and heating the same;
   (e) rinsing said membrane with water; and
   (f) drying said membrane.

8. The method of claim 4 wherein step (i) of step (b) is conducted at about 80° C. for about one minute.

9. The method of claim 5 wherein step (iii) of step (b) is conducted at about 40° C. for about an hour.

10. A membrane made by the method of claim 1 or 4 or 7.

* * * * *

UNITED STATES PATENT AND TRADEMARK OFFICE
CERTIFICATE OF CORRECTION

PATENT NO. : 5,476,590

DATED : December 19, 1995

INVENTOR(S) : Brose, Friesen, Lowell, McCray and Radovich

It is certified that error appears in the above-indentified patent and that said Letters Patent is hereby corrected as shown below:

Col. 1, line 42: delete the hyphen (-) between "vinyl" and "idenefluoro"

Col. 2, line 38: after "$Na_2S_2O_4$" insert -- at --

Col. 2, line 48: delete "$CHCH_3COOH$" insert -- $CH_3COOH$ --

Col. 3, line 26: delete "dithionate" insert -- dithionite --

Signed and Sealed this

Twenty-sixth Day of March, 1996

Attest:

BRUCE LEHMAN

Attesting Officer        Commissioner of Patents and Trademarks